US012586694B2

(12) United States Patent
Fu et al.

(10) Patent No.: US 12,586,694 B2
(45) Date of Patent: Mar. 24, 2026

(54) MULTICORE CABLE

(71) Applicant: SUMITOMO ELECTRIC INDUSTRIES, LTD., Osaka (JP)

(72) Inventors: Wei Fu, Tochigi (JP); Hirotaka Kato, Tochigi (JP); Takumi Ooshima, Tochigi (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 128 days.

(21) Appl. No.: 18/407,752

(22) Filed: Jan. 9, 2024

(65) Prior Publication Data

US 2025/0226131 A1 Jul. 10, 2025

(51) Int. Cl.
*H01B 7/04* (2006.01)
*H01B 7/00* (2006.01)

(52) U.S. Cl.
CPC ............. *H01B 7/04* (2013.01); *H01B 7/0009* (2013.01)

(58) Field of Classification Search
CPC ........ H01B 3/441; H01B 7/0009; H01B 7/02; H01B 7/0216; H01B 7/04; H01B 7/06; H01B 7/08; H01B 7/0869; H01B 7/0876; H01B 7/18; H01B 7/187; H01B 7/1875; H01B 9/003; H01B 9/02; H01B 11/002; H01B 11/02; H01B 11/04; H01B 11/06; H01B 11/08; H01B 11/10
USPC .......................................... 174/102 R–122 R
See application file for complete search history.

(56) References Cited

U.S. PATENT DOCUMENTS 10,418,150 B2 * 9/2019 Tanaka .................... H01B 7/02
2011/0088926 A1 * 4/2011 Grogl ................ H01B 11/1091 174/107
2014/0190741 A1 * 7/2014 Hayakawa .......... B60R 16/0215 174/72 A
2016/0300641 A1 * 10/2016 Mayama ................ H01B 13/24
2018/0182508 A1 * 6/2018 Tanaka ................... H01B 3/441
2019/0228874 A1 * 7/2019 Kohori ................... H01B 11/02
2019/0295744 A1 * 9/2019 Kobayashi ............ B60R 16/023
2019/0344733 A1 * 11/2019 Toyoshima .......... H02G 3/0406
2020/0066425 A1 * 2/2020 Kobayashi ............. H01B 9/003
2020/0168359 A1 * 5/2020 Kohori ................. H01B 7/0869
2022/0028579 A1 * 1/2022 Kobayashi ........... H01B 7/0045
2022/0115164 A1 * 4/2022 Ooshima .................. H01B 7/18
2022/0145539 A1 * 5/2022 Meier .................. D21G 9/0009

FOREIGN PATENT DOCUMENTS

JP 2020-109756 7/2020

* cited by examiner

*Primary Examiner* — William H. Mayo, III
(74) *Attorney, Agent, or Firm* — IPUSA, PLLC

(57) ABSTRACT

A multicore cable includes a core in which multiple electrical wires are twisted together, a release layer covering the core, and a jacket covering the release layer. A lay length for the multiple electrical wires is greater than or equal to 21 times and less than or equal to 28 times a long dimension of the core, and the release layer is fixed to the jacket.

13 Claims, 2 Drawing Sheets

MULTICORE CABLE

TECHNICAL FIELD

The present disclosure relates to a multicore cable.

BACKGROUND

Japanese Unexamined Patent Application Publication No. 2020-109756 (Patent Document 1) discloses a multicore cable that includes a core in which multiple core insulating wires are twisted, and that includes a sheath layer covering the outer periphery of the core.

SUMMARY

A multicore cable in the present disclosure includes a core in which multiple electrical wires are twisted together, a release layer covering the core, and a jacket covering the release layer. A lay length for the multiple electrical wires is greater than or equal to 21 times and less than or equal to 28 times a long dimension of the core, and the release layer is fixed to the jacket.

DESCRIPTION OF THE EMBODIMENTS

Problem to be Solved by the Present Disclosure

In order to connect electrical wires in a multicore cable to a device or the like, a jacket that covers all of the electrical wires has been removed by pulling the jacket at an end of the multicore cable in a longitudinal direction of the multicore cable. From the viewpoint of enhancing workability, the jacket of the multicore cable has been required to be easily removed.

Therefore, an object of the present disclosure is to provide a multicore cable whose jacket is capable of being easily removed.

Effects of the Present Disclosure

The present disclosure provides a multicore cable whose jacket is capable of easily being removed.

DESCRIPTION OF EMBODIMENTS OF THE PRESENT DISCLOSURE

Embodiments of the present disclosure will be first listed and described as follows. In the following description, the same or corresponding components will be denoted by the same numerals, and the same description thereof will not be repeated.

(1) A multicore cable in one aspect of the present disclosure includes a core in which multiple electrical wires are twisted together, a release layer covering the core, and a jacket covering the release layer.

A lay length for the multiple electrical wires is greater than or equal to 21 times and less than or equal to 28 times a long dimension of the core, and the release layer is fixed to the jacket.

(2) In (1) above, multiple electrical wires of a core include two first electrical wires and two second electrical wires, the two second electrical wires constitute a twisted pair electrical wire, and a ratio of a long dimension of a core to a short dimension of the core may be greater than or equal to 1.5 and less than or equal to 1.8, in a cross section perpendicular to a longitudinal direction of the core.

DETAILS OF EMBODIMENTS OF THE PRESENT DISCLOSURE

Specific examples of a multicore cable according to one embodiment (hereinafter referred to as “the present embodiment”) of the present disclosure will be described below with reference to the drawings. The present invention is not limited to these examples, and is set forth in the claims. The present invention covers all changes made within a meaning equivalent to the claim and a scope set forth in the claims.

In the present specification, first, second, and the like may be added to names of members, such as a first electrical wire and a second electrical wire. The first, second, and the like are described only for the purpose of identifying respective members and preventing confusion in the description, and these are not intended to indicate the arrangement, priority, and the like. In this regard, when there is no possibility of confusion or when an explanation is provided collectively, members can be simply referred to as, for example, electrical wires.

[Multicore Cable]

Figure 1:
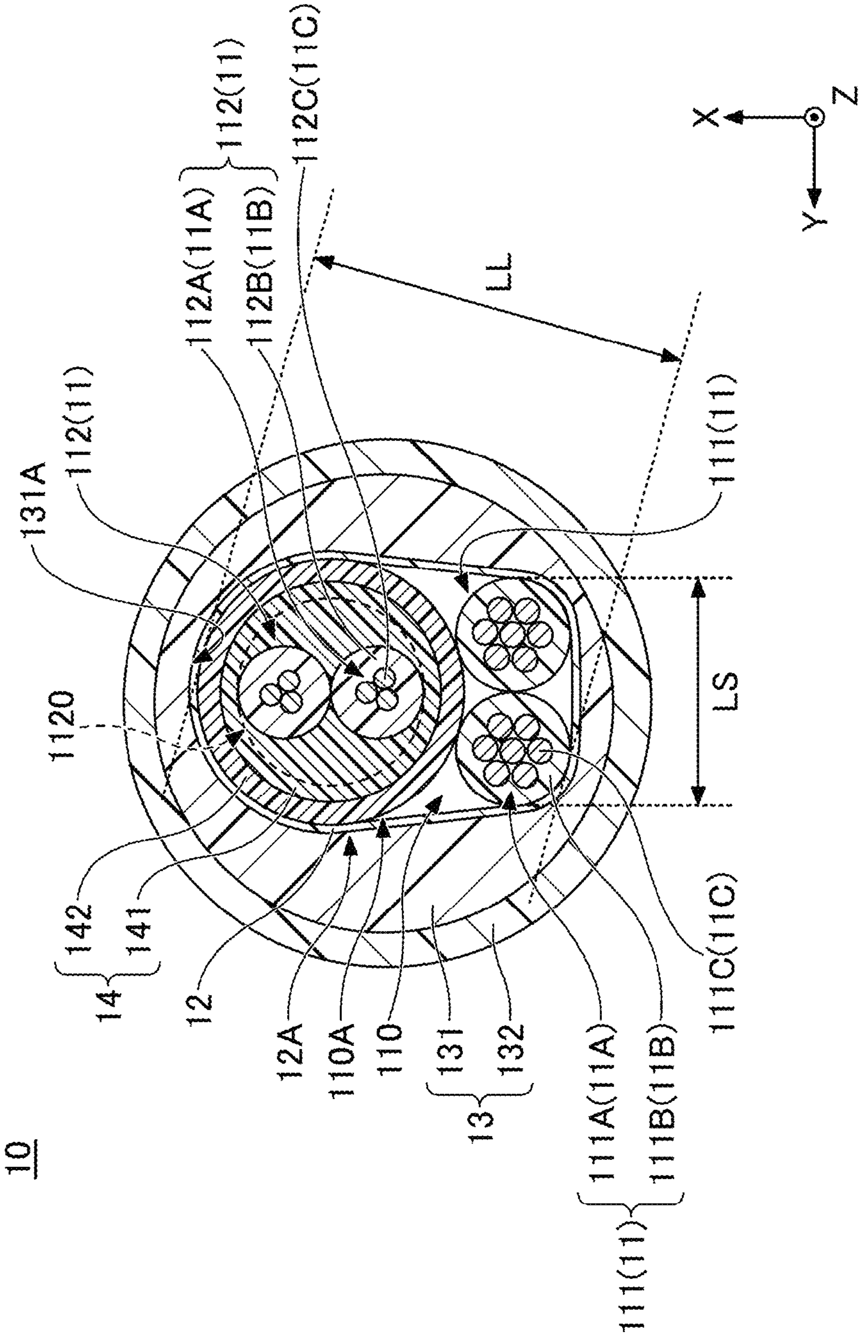
FIG. 1 is a cross-sectional view of a multicore cable taken along a plane perpendicular to a longitudinal direction in one aspect of the present disclosure.

FIG. 1 is a schematically sectional view of a multicore cable 10 perpendicular to a longitudinal direction according to the present embodiment. In FIG. 1, the longitudinal direction of the multicore cable 10 is along a Z-axis, namely an axis perpendicular to a paper plane. FIG. 1 shows a cross section taken along an XY plane perpendicular to the Z-axis.

As shown in FIG. 1, the multicore cable 10 of the present embodiment includes a core 110 in which electrical wires 11 are twisted together, a release layer 12 covering the core 110, and a jacket 13 covering the release layer 12.

Each member included in the multicore cable according to the present embodiment will be described below.

(1) Core

The core 110 has a configuration in which the multiple electrical wires 11 are twisted together.

(1-1) Electrical Wire

The electrical wire 11 in the core 110 can include a conductor 11A and an insulator 11B covering the conductor 11A.

(1-1-1) Conductor

The conductor 11A can be constituted by a single conductor strand, or multiple conductor strands. When the conductor 11A includes multiple conductor strands 11C, the conductor 11A can be constituted by stranded wires in which multiple conductor strands 11C are twisted together.

For example, as shown in FIG. 1, a first conductor 111A can include stranded wires that are multiple first conductor wires 111C. A second conductor 112A can include stranded wires that are multiple second conductor wires 112C.

The material of the conductor 11A is not particularly limited. For example, copper alloy, copper, plated copper alloy, or copper can be used. For example, soft copper can be used as copper.

(1-1-2) Insulator

The insulator 11B can cover an outer surface of the conductor 11A as shown in FIG. 1.

The materials that the insulator 11B can contain will be described below.

(Resin)

The insulator 11B can include one or more resins. The resins are not particularly limited. For example, one or more resins, selected from among fluoropolymers such as polytetrafluoroethylene (PTFE), tetrafluoroethylene-perfluoroalkyl vinyl ether copolymer (PFA), tetrafluoroethylene-hexafluoropropylene copolymer (FEP), and ethylene-tetrafluoroethylene copolymer (ETFE); a polyester such as polyethylene terephthalate (PET); and polyolefin resins or the like such as polyethylene and polypropylene may be used. The resin of the insulator 11B may be cross-linked, or may not be cross-linked.

(Additive)

In addition to the above resins, the insulator 11B can contain one or more additives that are selected from among a flame retardant, an antioxidant, a degradation inhibitor, an acid receiver, a colorant, a crosslinker, a crosslinking aid, a processing aid, a filler, a lubricant, and the like.

(1-2) Configuration of Electrical Wires in Core

A configuration of the electrical wires 11 of the core 110 in the multicore cable 10 according to the present embodiment is not particularly limited. For the electrical wires 11 of the core 110, any number of electrical wires or any combination of electrical wires 11 can be adopted depending on use or the like of the multicore cable 10.

For example, as in the core 110 in the multicore cable 10 shown in FIG. 1, the core 110 can include two first electrical wires 111 and two second electrical wires 112 that are used as multiple electrical wires 11. An outer diameter of a first electrical wire and an outer diameter of a second electrical wire are not particularly limited, and the same outer diameter or different outer diameters may be used.

As shown in FIG. 1, the first electrical wire 111 includes a first conductor 111A that is the conductor 11A, and includes a second insulator 111B that is the insulator 11B. The second electrical wire 112 includes a second conductor 112A that is the conductor 11A, and includes a second insulator 112B that is the insulator 11B. One or more members in each electrical wire are adopted as described above.

In the core 110, two second electrical wires 112 can constitute a twisted pair electrical wire 1120 in which the electrical wires are pretwisted together. In a case of the multicore cable 10 shown in FIG. 1, the twisted pair electrical wire 1120 and two first electrical wires 111 are twisted together to constitute the core 110.

By use of the second electrical wires 112 as the twisted pair electrical wire, the second electrical wires 112 can suppress deterioration and attenuation of signals to be transmitted. In addition, by use of the second electrical wires 112 as the twisted pair electrical wire, two electrical wires can be handled together when performing wiring or the like. Thus, workability in performing the wiring can be enhanced.

The twisted pair electrical wire 1120 may also include a coating layer 14 that covers the two twisted second wires 112. The coating layer 14 may consist of one layer, or may consist of two layers that include the first coating layer 141 and the second coating layer 142. The coating layer 14 may consist of three or more layers.

The material of the coating layer 14 is not particularly limited. For example, the same material as that of the insulator 11B may be used, or a different material from that of the insulator 11B may be used.

As the material of the first coating layer 141, one or more that are selected from among, for example, thermoplastic polyurethane elastomer, ethylene-vinyl acetate copolymer (EVA), ethylene-ethyl acrylate copolymer (EEA), and the like may be used. As the material of the second coating layer 142, for example, thermoplastic polyurethane elastomer or the like can be used.

The coating layer 14 can have a configuration in which a tape is wound, and may be an extrusion-molded resin tube.

Without including a coating layer 14, the twisted pair electrical wire 1120 may have a configuration in which two second electrical wires 112 are exposed.

(1-3) Lay Length for Electrical Wires

Figure 2:
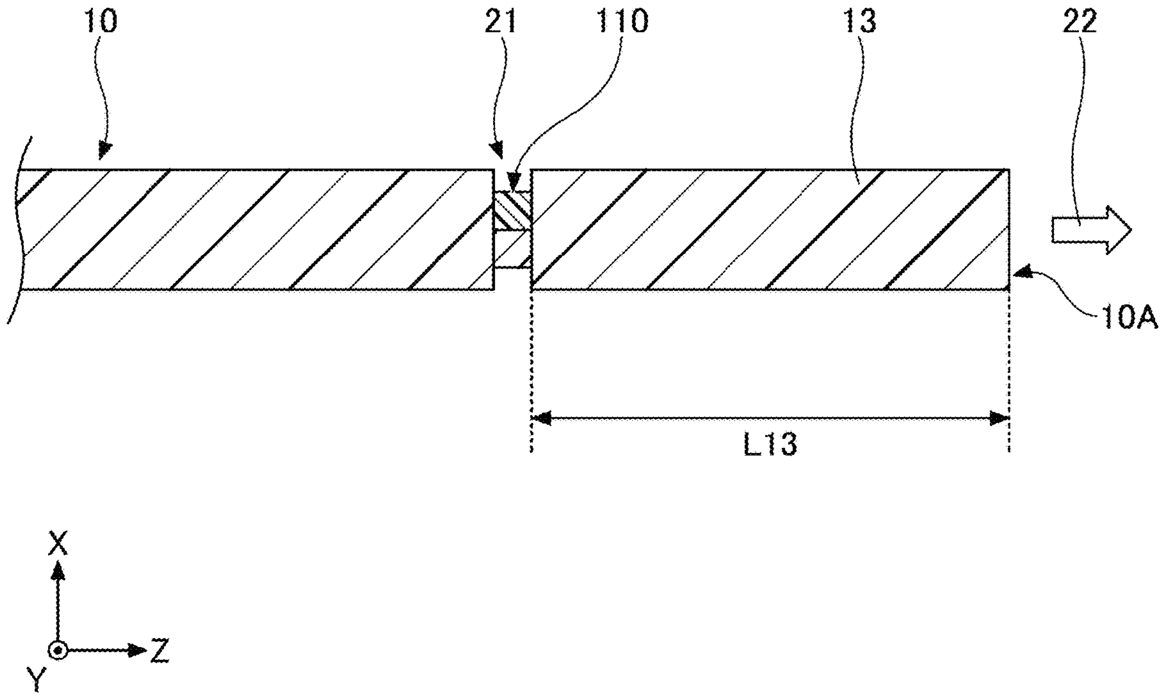
FIG. 2 is a diagram for describing an operation to remove a jacket at an end of the multicore cable.

The jacket 13 of the multicore cable 10 can be removed, for example, by a first step and a second step. In the first step, as shown in FIG. 2, at an end 10A of the multicore cable 10, a cut 21 that reaches the release layer 12 can be formed in the jacket 13. Then, in the second step, the jacket 13 is pulled along the longitudinal direction of the multicore cable 10 as expressed by a block arrow 22, and as a result, the jacket can be removed.

In the first step, when a length L13 corresponding to a distance from the end 10A of the multicore cable 10 to a position where the cut 21 is formed is selected, the length L13 of the jacket 13 that is to be removed, that is, a length of the core 110 that is exposed can be selected Conventionally, for example, when the length L13 of the jacket 13 to be removed is 400 mm or more, the cut 21 is formed in the first step such that the length L13 of the jacket 13 removed at one time is about 100 mm, and the first step and the second step are repeated. As a result, the jacket 13 having a desired length is removed. However, from the viewpoint of enhancing productivity, even if the length L13 of the jacket 13 to be removed is 400 mm or more, there is need for a multicore cable 10 from which the jacket 13 can be collectively removed by performing the first step and the second step once. Therefore, in the present specification, a multicore cable from which the jacket can be easily removed refers to a multicore cable from which the jacket 13 having the length L13 of 400 mm can be collectively removed along the longitudinal direction of the multicore cable 10.

Therefore, the inventors of the present invention have studied a multicore cable from which a jacket can be easily removed.

As a result of the study, it has been found that when the lay length for the electrical wires 11 in the core 110 is set within a predetermined range, in a case where the jacket 13 including the release layer 12 is removed along the longitudinal direction of the multicore cable 10, a friction force between the release layer 12 and the core 110 can be reduced. This is because when the lay length for the electrical wires 11 in the core 110 is set within the predetermined range, a contact area between the core 110 and the release layer 12 is suppressed and the resulting friction force can be reduced.

Therefore, in the multicore cable 10 according to the present embodiment, the lay length for the electrical wires 11 in the core 110 can be set to be greater than or equal to 21 times and less than or equal to 28 times the long dimension LL of the core 110.

In the multicore cable 10 according to the present embodiment, when the lay length for the electrical wires 11 in the core 110 is set to be 21 times or more the long dimension LL of the core 110, a contact area between the core 110 and the release layer 12 can be suppressed. With this arrangement, the multicore cable 10 according to the present embodiment can suppress friction between the core 110 and the release layer 12, and thus the jacket 13 can be easily removed.

Further, when the lay length for the electrical wires 11 in the core 110 is set to be 28 times or less the long dimension LL of the core 110, the multicore cable 10 according to the present embodiment can be made into a multicore cable with excellent flexibility. The flexibility means that electrical wires in the multicore cable have the characteristics that are less likely to break when the multicore cable is repeatedly bent.

The lay length means a length at which the electrical wires 11 constituting the core 110 are twisted once. The length at which the electrical wires 11 constituting the core 110 are twisted once means a length along a central axis of the core 110. The lay length can be measured according to JIS C 3005 (2014).

(1-4) Long Dimension and Short Dimension of Core

In the core 110, a ratio of the long dimension LL of the core 110 to the short dimension LS of the core as expressed by LL÷LS may be greater than or equal to 1.5 and less than or equal to 1.8, in a cross section perpendicular to the longitudinal direction of the core.

In the multicore cable 10 of the present embodiment, when the ratio of the long dimension LL of the core 110 to the short dimension LS of the core 110 is greater than or equal to 1.5 and less than or equal to 1.8, the jacket 13 can be removed particularly easily.

In the multicore cable 10 of the present embodiment, when the ratio of the long dimension LL of the core 110 to the short dimension LS of the core 110 is set to be 1.8 or less, twist waves can be reduced and the appearance of the multicore cable 10 can be improved.

The twist waves mean spiral stripes appearing on the surface of the jacket 13. At each portion of the surface of the jacket 13 at which electrical wires 11 in the core 110 are laminated, a relatively protruding protrusion is formed, and a relatively recessed recess is formed at each portion that is between electrical wires 11 in the core 110. In this arrangement, the multicore cable of the present embodiment has twist waves corresponding to a twist form of the electrical wires 11 in the core 110, on the surface of the jacket 13.

(2) Release Layer

The release layer 12 can cover the core 110, and can be disposed in direct contact with the outer surface 110A of the core 110.

The release layer 12 can have a configuration in which, for example, a tape or a nonwoven fabric is wound around the core 110.

The inventors of the present invention have studied a configuration in which the release layer 12 is disposed between the core 110 and the jacket 13, in studying the multicore cable 10 from which the jacket 13 can be easily removed.

However, when the release layer 12 was disposed between the core 110 and the jacket 13, and the jacket 13 having a length L13 of 400 mm or more was removed at one time, the release layer 12 overlapped between the jacket 13 and the core 110, and there were cases where the jacket did not move at an overlapping portion and could not be removed further. That is, there were cases where the release layer 12 was clogged between the jacket 13 and the core 110.

The inventors of the present invention have studied a cause of the clogging of the release layer 12 between the jacket 13 and the core 110, when removing the jacket 13. As a result, it has been found that when the release layer 12 is clogged between the jacket 13 and the core 110, the release layer 12 is not fixed (adhered) to the jacket 13.

In view of the above situation, the multicore cable 10 of the present embodiment can be made into a configuration in which the release layer 12 is fixed to the jacket 13. By fixing the release layer 12 to the jacket 13, the release layer 12 and the jacket 13 can be integrally separated from the core 110 when removing the jacket 13, and as a result, the jacket 13 can be easily removed. It is confirmed that the release layer 12 is fixed to the jacket 13 in any cross section perpendicular to a longitudinal direction of the multicore cable 10. It can be judged that the release layer is fixed to the jacket 13 when at least a portion of the release layer 12 is fixed at an interface between the release layer 12 and the jacket 13.

A melting temperature T12 of the material that is contained in a surface 12A of the release layer 12 in contact with the jacket 13, and a melting temperature T13 of the material that is contained in a surface 131A of the jacket 13 in contact with the release layer 12 may be selected so as to cause the release layer 12 to be fixed to the jacket 13.

The melting temperature T12 and the melting temperature T13 may be similar to each other, or may be defined by T12<T13. The melting temperature T12 and the melting temperature T13 are defined by T12>T13. If a difference between the melting temperature T12 and the melting temperature T13 is about 60° C. or less, a configuration in which the release layer 12 can be fixed to the jacket 13 can be made.

The surface 12A of the release layer 12 in contact with the jacket 13, and the surface 131A of the jacket 13 in contact with the release layer 12 have constant thicknesses. In this case, the surface 12A can be referred to as a layer of the release layer 12 in contact with the jacket 13, and the surface 131A can be referred to as a layer of the jacket 13 in contact with the release layer 12.

The melting temperature means a peak temperature of an endothermic peak that appears first when a material to be evaluated is heated from room temperature (25° C.) at a rate of temperature rise of 10° C./min by differential scanning calorimetry (DSC).

A difference between the melting temperature T12 of the material contained in the surface 12A of the release layer 12 in contact with the jacket 13 and the melting temperature T13 of the material contained in the surface 131A of the jacket 13 in contact with the release layer 12 may be set to 60° C. or less.

By setting the difference between the melting temperature T12 and the melting temperature T13 to 60° C. or less, a portion proximate to the surface 12A of the release layer 12 in contact with the jacket 13 is melted when the jacket 13 is extruded and molded on the release layer 12, and thus the release layer 12 can be easily fixed to the jacket 13.

The difference between the melting temperature T12 and the melting temperature T13 may be set to 50° C. or less.

In this case, the difference between the melting temperature T12 and the melting temperature T13 may be greater than or equal to 0° C. and less than or equal to 60° C., or may be greater than or equal to 0° C. and less than or equal to 50° C.

When the release layer 12 includes multiple materials, a difference between a melting temperature T121 of at least a portion of the material in the surface of the release layer 12 in contact with the jacket 13 and the melting temperature T13 of the material in the surface of the jacket 13 in contact with the release layer 12 may be set to 60° C. or less.

By setting the difference between the melting temperature T121 and the melting temperature T13 to 60° C. or less, at least a portion of the surface 12A of the release layer 12 in contact with the jacket 13 can be melted when the jacket 13 is extruded and molded onto the release layer 12. In this arrangement, at least a portion of the release layer 12 can be fixed to the jacket 13 when the jacket 13 is extruded and molded onto the release layer 12.

The difference between the melting temperature T121 and the melting temperature T13 may be 50° C. or less.

In this case, the difference between the melting temperature T121 and the melting temperature T13 may be greater than or equal to 0° C. and less than or equal to 60° C., or may be greater than or equal to 0° C. and less than or equal to 50° C.

The material of the release layer 12 is not particularly limited, and such a material may include one or more resins that are selected from among, for example, a polyester resin such as polyethylene terephthalate (PET), and polyolefin resins or the like such as polyethylene and polypropylene.

The release layer 12 may include a nonwoven fabric or the like having a resin fiber, or may include a tape or the like having a resin substrate. When the release layer 12 includes a nonwoven fabric, the release layer 12 can be easily cut in a case where the jacket 13 is removed, and thus the jacket 13 can be easily removed. In addition, when the release layer 12 includes a nonwoven fabric, in a case where the jacket 13 is removed, generation of fine chips into which the release layer 12 is torn can be prevented.

(3) Jacket

The jacket 13 covers the release layer 12 so as to contact the release layer 12.

When the multicore cable 10 includes the jacket 13, the electrical wires 11 included in the core 110 are protected, and thus durability is enhanced.

(Resin)

The jacket 13 can include one or more resins. The resins are not particularly limited, and for example, one that is selected from among polyolefin-based resins such as polyethylene and ethylene-vinyl acetate copolymer (EVA), a polyurethane elastomer (polyurethane resin), a polyester elastomer, a polyvinyl chloride (PVC), and the like can be used, or alternatively, a composition derived from a combination of at least two selected from the above materials can be used.

As shown in FIG. 1, the jacket 13 can include a first jacket 131 and a second jacket 132 that are arranged in order from a position close to the core 110. The jacket 13 is not limited to the manner of having two layers shown in FIG. 1, and may include a single layer, or may include multiple layers that are three or more layers. The first jacket 131 and the second jacket 132 can be made of different materials, or can be made of the same material.

The materials of the first jacket 131 and the second jacket 132 are not particularly limited, and can contain the resin as described in the material of the jacket 13.

The first jacket 131 may contain, for example, one or more that are selected from among a polyurethane resin and a polyolefin-based resin.

The second jacket 132 may contain, for example, a polyurethane resin with excellent abrasion resistance as the resin. The second jacket 132 is disposed outside the multicore cable 10, and durability of the multicore cable 10 can be enhanced by containing the polyurethane resin as the resin in the second jacket 132.

(Additive)

In addition to the above resin, the jacket 13 can contain one or more additives that are selected from among a flame retardant, an antioxidant, a degradation inhibitor, an acid receiver, a colorant, a crosslinker, a crosslinking aid, a processing aid, a filler, a lubricant, and the like.

EXAMPLE

Although specific examples are described below, the present invention is not limited to these examples.

(Evaluation Method)

First, an evaluation method of a multicore cable that was fabricated in the following experimental example will be described as follows.

(1) Long Dimension and Short Dimension of Core

For a long dimension and a short dimension of the core 110, the long dimension and the short dimension of the core 110 were measured in each of three cross sections that were along the longitudinal direction of the core 110, and an average value that was obtained using the three cross sections was used as each of the long dimension and the short dimension of the core 110. For the core 110 that was evaluated, the three cross sections were set to be 10 cm apart along the longitudinal direction of the multicore cable 10.

(2) Lay Length

The lay length for multiple electrical wires was measured according to JIS C 3005 (2014).

(3) Workability Test

As shown in FIG. 2, in the end 10A of the multicore cable 10, the cut 21 reaching the release layer 12 was formed at a position of 400 mm from the end 10A (first step). Next, the jacket 13 was pulled along the longitudinal direction of the multicore cable 10 as expressed by the block arrow 22, and the jacket 13 was thereby removed (second step).

In the second step, when the jacket was removed in a case where the magnitude of a force pulling the jacket was 30 N or less, it was evaluated as A. In the second step, when the jacket could not be removed even in a case where the force pulling the jacket was 30 N, it was evaluated as B.

When A is given in the evaluation in the workability test, it can be evaluated as a multicore cable from which the jacket can be easily removed. When B is given in the evaluation in the workability test, it can be evaluated as a multicore cable for which it is hard to remove the jacket.

(4) Bending Test

The test was conducted at ambient temperature (25° C.) in accordance with JASO C467-97 7.16.

Figure 3:
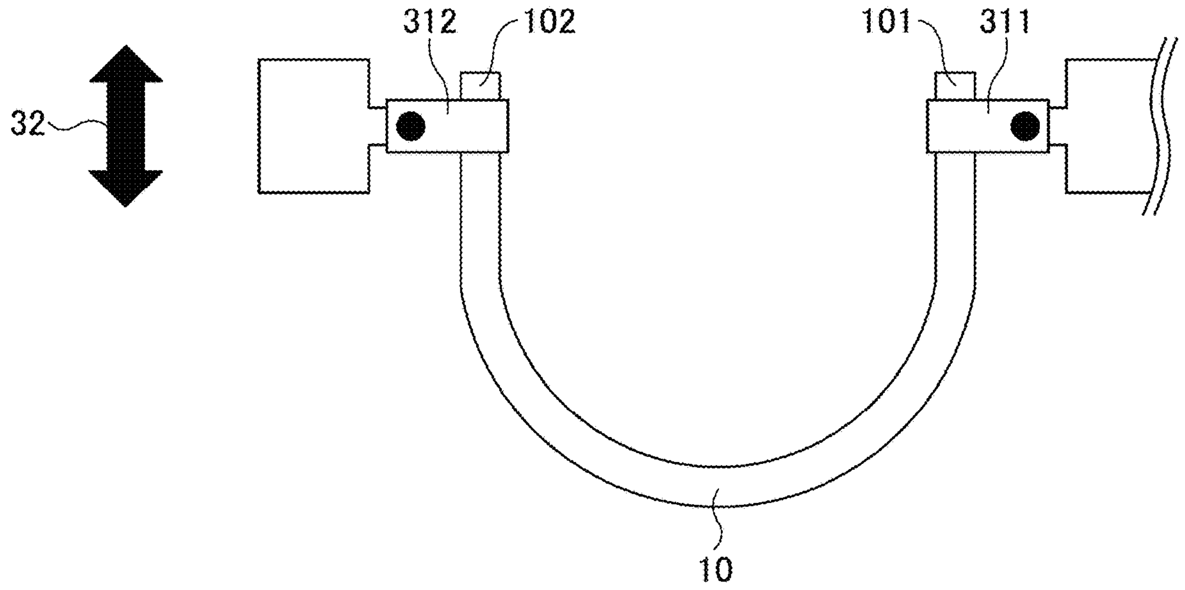
FIG. 3 is a diagram for describing a bending test.

As shown in FIG. 3, a first end 101 of the multicore cable 10 in the longitudinal direction was held by a first blanket 311 in a state where the multicore cable 10 was bent in a U-shape. The first end 101 was used as a fixed end. A second end 102 that was located opposite the first end 101 of the multicore cable 10 was held by a second blanket 312.

The second blanket 312 was repeatedly moved up and down as shown by the block arrow 32. The second blanket 312 was moved at a speed of 200 times per minute.

After the second blanket 312 was reciprocated 1.6 million times, an electrical resistance value of all the electrical wires included in the multicore cable 10 was evaluated.

After the above test, for the electrical resistance value of all the electrical wires included in the multicore cable 10, when an increase from an electrical resistance value that was obtained before the test is 10% or less the electrical resistance value before the test, and no crack was observed on the surface of the multicore cable 10, it was evaluated as A.

After the above test, for the electrical resistance value of at least one electrical wire included in the multicore cable 10, when the increase from the electrical resistance value before the test was more than 10% the electrical resistance value before the test, or when a crack was observed on the surface of the multicore cable 10, it was evaluated as B.

When A was given in the evaluation in the bending test, the multicore cable was evaluated as having excellent flexibility. When B was given in the evaluation in the bending test, the multicore cable is evaluated as having inferior flexibility.

(5) Twist Wave Test

The outer diameter was measured continuously along the longitudinal direction of the multicore cable, and evaluation was performed by the number of abnormal points at which the outer diameter rapidly increased compared with the other portions.

When an average value of the number of abnormal points that were detected per 1 km along the longitudinal direction of the multicore cable was 1 or less, it was evaluated as A, and when the average value was greater than 1, it was evaluated as B. When A is given in the evaluation in the twist wave test, a multicore cable can be evaluated as having inconspicuous twist waves. When B is given in the evaluation in the twist wave test, a multicore cable can be evaluated as having conspicuous twist waves.

(6) Melting Temperature

A melting temperature T121 of at least a portion of the material that was contained in the surface of the release layer 12 in contact with the jacket 13, and a melting temperature T13 of the material that was contained in the surface of the jacket 13 in contact with the release layer 12 were evaluated using DSC. Each melting temperature was evaluated by heating from room temperature (25° C.) at a rate of temperature rise of 10° C./min. A peak temperature of an endothermic peak that appeared first on an obtained DSC curve was used as the melting temperature.

(Manufacturing Condition of Multicore Cable)

Multicore cables in experimental examples are described below.

Experimental examples 1 to 3 are examples, and experimental examples 4 and 5 are comparative examples.

Experimental Example 1

A multicore cable having the same structure in the cross section perpendicular to the longitudinal direction as described in the multicore cable 10 as shown in FIG. 1 was fabricated. Table 1 shows measurement results for a lay length P, the long dimension LL, and the short dimension LS of the core 110, as well as including a ratio (P÷LL) of the lay length for electrical wires to a determined long dimension of the core, and a ratio (LL÷LS) of the long dimension LL of the core to the short dimension LS of the core.

The release layer 12 was formed by spirally winding a nonwoven tape on the core 110, and the nonwoven tape was made of fibers having a core-sheath configuration in which the core is made of polyethylene terephthalate and a sheath covering the core is polyethylene.

For the jacket 13, ethylene-vinyl acetate copolymer (EVA) was used as a resin in the first jacket 131, and polyurethane was used as a resin in the second jacket 132.

The melting temperature T121 of polyethylene that was a material contained in the surface of the release layer 12 in contact with the jacket 13 was 130° C., and the melting temperature T13 of EVA that was contained in the first jacket 131 was 80° C. The resulting temperature difference is 50° C.

When the cross section of an obtained multicore cable was observed, it was confirmed that the release layer 12 was fixed to the jacket 13.

Evaluation results are shown in Table 1.

Example 2 to Example 5

The lay length for the electrical wires 11 in the core 110 was set to the value shown in Table 1. By adjusting a distance between electrical wires 11, the long dimension LL and the short dimension LS of the core 110 were set to values shown in Table 1. The multicore cable 10 was fabricated under the same conditions as described in Example 1 except for the items illustrated above, and evaluation was performed. The twist wave test was omitted in Examples 4 and 5.

In Experimental examples 2 to 5, it was also confirmed that the release layer 12 was fixed to the jacket 13.

The evaluation results are shown in Table 1.

TABLE 1

| | | EXPERIMENTAL EXAMPLE 1 | EXPERIMENTAL EXAMPLE 2 | EXPERIMENTAL EXAMPLE 3 | EXPERIMENTAL EXAMPLE 4 | EXPERIMENTAL EXAMPLE 5 |
|---|---|---|---|---|---|---|
| CORE | LAY LENGTH P | 140 | 120 | 140 | 100 | 170 |
| | LONG DIMENSION LL (mm) | 5.7 | 5.7 | 6.8 | 5.7 | 5.7 |
| | SHORT DIMENSION LS (mm) | 3.4 | 3.4 | 3.4 | 3.4 | 3.4 |
| | P ÷ LL | 24.56 | 21 | 24.56 | 18 | 30 |
| | LL ÷ LS | 1.68 | 1.68 | 2.00 | 1.68 | 1.68 |
| WORKABILITY TEST | | A | A | A | B | A |
| BENDING TEST | | A | A | A | A | B |
| UNDULATION TEST | | A | A | B | — | — |

The invention claimed is:

1. A multicore cable comprising:

a core including multiple electrical wires;

a release layer covering the core; and a jacket covering the release layer, wherein the multiple electrical wires include two first electrical wires, and two second electrical wires constituting a twisted pair electrical wire in which the two second electrical wires are twisted, wherein in the core, the two first electrical wires and the twisted pair electrical wire are twisted, and wherein a lay length for the core is greater than or equal to 21 times and less than or equal to 28 times a long dimension of the core, wherein the release layer is fixed to the jacket, and wherein the twisted pair electrical wire includes a coating layer covering the two second electrical wires, the coating layer including a first coating layer and a second coating layer.

2. The multicore cable according to claim 1, wherein a ratio of the long dimension of the core to a short dimension of the core is greater than or equal to 1.5 and less than or equal to 1.8, in a cross section perpendicular to a longitudinal direction of the core, and the multicore cable has a round cross section.

3. The multicore cable according to claim 1, wherein the twisted pair electrical wire is in contact with the two first electrical wires.

4. The multicore cable according to claim 1, wherein an outer diameter of the twisted pair electrical wire is greater than an outer diameter of each of the two second electrical wires.

5. The multicore cable according to claim 1, wherein the release layer includes polyethylene terephthalate.

6. The multicore cable according to claim 1, wherein the release layer includes polyethylene.

7. The multicore cable according to claim 1, wherein the jacket includes polyethylene and ethylene-vinyl acetate copolymer.

8. The multicore cable according to claim 1, wherein the jacket includes polyurethane.

9. The multicore cable according to claim 1, wherein the release layer has a first surface in contact with the jacket, wherein the jacket has a second surface in contact with the release layer, wherein the first surface includes a first material and the second surface includes a second material, and wherein a melting temperature of the first material is higher than a melting temperature of the second material.

10. The multicore cable according to claim 1, wherein the release layer has a first surface in contact with the jacket, wherein the jacket has a second surface in contact with the release layer, wherein the first surface includes a first material and the second surface includes a second material, and wherein a difference between a melting temperature of the first material and a melting temperature of the second material is 60° C. or less.

11. The multicore cable according to claim 1, wherein the jacket is an extruded layer that directly contacts the release layer without an intermediate layer, and wherein at least a portion of the release layer is fused to the jacket at an interface between the jacket and the release layer.

12. The multicore cable according to claim 1, wherein the release layer is a nonwoven tape wound around the core and includes polyethylene terephthalate.

13. The multicore cable according to claim 1, wherein the jacket includes a first jacket layer formed of ethylene-vinyl acetate copolymer and a second jacket layer formed of polyurethane.

* * * * *